(12) United States Patent
Shim et al.

(10) Patent No.: US 9,716,538 B2
(45) Date of Patent: Jul. 25, 2017

(54) METHOD AND APPARATUS FOR GROUPING ANTENNAS IN MULTIPLE-INPUT MULTIPLE-OUTPUT ANTENNA SYSTEM

(71) Applicants: Samsung Electronics Co., Ltd, Gyeonggi-do (KR); Korea University Research and Business Foundation, Seoul (KR)

(72) Inventors: Byonghyo Shim, Seoul (KR); Byungju Lee, Seoul (KR); Tae-Young Kim, Gyeonggi-do (KR); Ji-Yun Seol, Gyeonggi-do (KR)

(73) Assignees: SAMSUNG ELECTRONICS CO., LTD., Suwon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 15/021,674

(22) PCT Filed: Sep. 12, 2014

(86) PCT No.: PCT/KR2014/008513
§ 371 (c)(1),
(2) Date: Mar. 11, 2016

(87) PCT Pub. No.: WO2015/037936
PCT Pub. Date: Mar. 19, 2015

(65) Prior Publication Data
US 2016/0233936 A1  Aug. 11, 2016

(30) Foreign Application Priority Data

Sep. 13, 2013  (KR) .................. 10-2013-0110152
Feb. 26, 2014  (KR) .................. 10-2014-0022703

(51) Int. Cl.
H04B 7/04 (2017.01)
H04B 7/06 (2006.01)

(52) U.S. Cl.
CPC ......... *H04B 7/0478* (2013.01); *H04B 7/0473* (2013.01); *H04B 7/0617* (2013.01); *H04B 7/0691* (2013.01)

(58) Field of Classification Search
CPC .. H04B 7/0478; H04B 7/0691; H04B 7/0617; H04B 7/0473

(Continued)

(56) References Cited

U.S. PATENT DOCUMENTS 8,305,956 B2 * 11/2012 Olesen ................. H04B 7/0452
                                                       370/208
8,842,640 B2 *  9/2014 Jeon ...................... H04B 7/0413
                                                       370/328

(Continued)

FOREIGN PATENT DOCUMENTS

KR  10-2012-0043113     5/2012
WO  WO 2011/163588 A2  12/2011
WO  WO 2013/069957 A1   5/2013

OTHER PUBLICATIONS

International Search Report dated Jan. 5, 2015 in connection with International Application No. PCT/KR2014/008513; 5 pages.

(Continued)

*Primary Examiner* — Siu Lee

(57) ABSTRACT

Disclosed are a method and an apparatus for grouping antennas in a multiple-input multiple-output antenna system. The method of the present invention comprises the steps of: measuring a channel vector for a plurality of antennas of a base station; grouping channel coefficients of the channel vector in accordance with a plurality of antenna grouping patterns and determining grouped codebook vectors corresponding to the grouped channel coefficients; selecting one (Continued)

of the antenna grouping patterns using the grouped codebook vectors for the antenna grouping patterns; and feeding back, to the base station, a pattern index indicating the selected antenna grouping pattern and a codebook index indicating the grouped codebook vector corresponding to the selected antenna grouping pattern.

20 Claims, 13 Drawing Sheets

(58) Field of Classification Search
USPC ........ 375/295, 316, 259, 260, 267, 285, 299
See application file for complete search history.

(56) References Cited

U.S. PATENT DOCUMENTS

| | | | |
|---|---|---|---|
| 2008/0260053 A1* | 10/2008 | Yun | H04B 7/0669 375/260 |
| 2011/0211662 A1 | 9/2011 | Varadarajan et al. | |
| 2013/0163544 A1 | 6/2013 | Lee et al. | |
| 2014/0241452 A1 | 8/2014 | Yang et al. | |
| 2014/0341312 A1 | 11/2014 | Lee et al. | |
| 2015/0236773 A1* | 8/2015 | Kim | H04B 7/0626 375/295 |

OTHER PUBLICATIONS

Written Opinion of the International Searching Authority dated Jan. 5, 2015 in connection with International Application No. PCT/KR2014/008513; 7 pages.
Alcatel-Lucent Shanghai Bell, et al., "Codebook Structure and Details", R1-130934, 3GPP TSG-RAN WG1 #72bis, Chicago, Illinois, Apr. 15-19, 2013, 6 pages.

* cited by examiner

METHOD AND APPARATUS FOR GROUPING ANTENNAS IN MULTIPLE-INPUT MULTIPLE-OUTPUT ANTENNA SYSTEM

CROSS-REFERENCE TO RELATED APPLICATION(S)

The present application claims priority under 35 U.S.C. §365 to International Patent Application No. PCT/KR2014/008513 filed Sep. 12, 2014, entitled "METHOD AND APPARATUS FOR GROUPING ANTENNAS IN MULTIPLE-INPUT MULTIPLE-OUTPUT ANTENNA SYSTEM", and, through International Patent Application No. PCT/KR2014/008513, to Korean Patent Application No. 10-2013-0110152 filed Sep. 13, 2013 and Korean Patent Application No. 10-2014-0022703 filed Feb. 26, 2014, each of which are incorporated herein by reference into the present disclosure as if fully set forth herein.

TECHNICAL FIELD

The present invention relates to a method and an apparatus for grouping antennas in a communication system having multiple-input multiple-output antennas.

BACKGROUND ART

A Full Dimension Multiple Input Multiple Output (FD-MIMO) communication system may be implemented by a Frequency Division Duplexing (FDD) scheme and a Time Division Duplexing (TDD) scheme. Since a system of the TDD scheme uses channel reciprocity between uplink and downlink, there is no great pressure on channel feedback. However, when an FD-MIMO technology is applied to a system of the FDD scheme used in many cellular networks, it is required to feedback channel state information to support beamforming at a transmitting end.

In general, the channel feedback is expressed by a finite number of feedback bits. When feedback information is incomplete, the beamforming at the transmitting end must be also inaccurate. In actual, when beamforming is not accurately performed in the multi-user MIMO system, inter-user interference is not completely removed and, as a result, a Signal to Interference and Noise Ratio (SINR) of a receiver is deteriorated. Accuracy of the channel state information directly influences a downlink multiplexing gain in the multi-user MIMO system. Particularly, in order to maintain a sum rate difference between complete channel state information and inaccurate channel state information within a predetermined range, the number of feedback bits for quantizing channels should be set in proportion to the number of Base Station (BS) antennas and a signal to noise ratio. The FD-MIMO system corresponds to a technology to acquire a high transmission rate through dozens to hundreds of antennas by the BS, and feedback load significantly increases in proportion to the number of antennas.

The performance of finite channel feedback is dependent on the accuracy of channel vector quantization. If beamforming is performed using an inaccurate quantized channel vector, inter-user interface is not completely removed in an interference limiting system and thus it is difficult to expect an increase in the sum rate. Particularly, in a case of the FD-MIMO communication system, as the number of transmission antennas increases, a dimension of a channel vector linearly increases. Accordingly, as the number of transmission antennas increases, an amount of feedback for quantizing the channel vector must increase. However, in order to not increase uplink overhead, the channel feedback should be expressed by as small a number of bits as possible and, accordingly, the accuracy of channel vector quantization is reduced and it is difficult to achieve a performance improvement through beamforming.

DETAILED DESCRIPTION OF THE INVENTION

Technical Problem

The present invention provides a method and an apparatus for transmitting/receiving feedback information on a channel state in a communication system.

The present invention provides a method and an apparatus for performing antenna grouping for uplink feedback.

The present invention provides a method and an apparatus in which a receiving end feeds back channel state information in order to allow a transmitting end to perform beamforming in an FD-MIMO antenna system.

The present invention provides a method and an apparatus for grouping antennas to reduce a dimension of a vector for channel quantization and reducing system feedback load.

The present invention provides a method and an apparatus for grouping antennas to reduce feedback load in uplink of the FD-MIMO antenna system.

Technical Solution

In accordance with an aspect of the present invention, a method of grouping antennas in a Multiple-Input Multiple-output MIMO antenna system is provided. The method includes: measuring a channel vector for a plurality of antennas of a base station; grouping channel coefficients of the channel vector according to a plurality of antenna grouping patterns and determining grouped codebook vectors corresponding to the grouped channel coefficients; selecting one antenna grouping pattern from the antenna grouping patterns by using the grouped codebook vectors for the antenna grouping patterns; and feeding back a pattern index indicating the selected antenna grouping pattern and a codebook index indicating a grouped codebook vector corresponding to the selected antenna grouping pattern to the base station.

In accordance with another aspect of the present invention, a method of grouping antennas in a Multiple-Input Multiple-output MIMO antenna system is provided. The method includes: receiving a pattern index indicating one of a plurality of antenna grouping patterns and a codebook index indicating a grouped codebook vector from a user terminal; extending the grouped codebook vector according to the antenna grouping pattern indicated by the pattern index and determining a codebook vector for the plurality of antennas; configuring a beamforming matrix by using the determined codebook vector; and precoding data by using the beamforming matrix and transmitting precoded data to the user terminal.

In accordance with another aspect of the present invention, a terminal apparatus supporting antenna grouping in a Multiple-Input Multiple-Output (MIMO) antenna system is provided. The terminal apparatus includes: a channel measurement unit that measures a channel vector for a plurality of antennas of a Base Station (BS); a controller that groups channel coefficients of the channel vector according to a plurality of antenna grouping patterns to determine grouped codebook vectors corresponding to the grouped channel coefficients and selects one antenna grouping pattern from the antenna grouping patterns by using the grouped codebook vectors for the antenna grouping patterns; and a transmitter that feeds back a pattern index indicating the selected antenna grouping pattern and a codebook index indicating a grouped codebook vector corresponding to the selected antenna grouping pattern to the BS.

In accordance with another aspect of the present invention, a Base Station (BS) apparatus supporting antenna grouping in a Multiple-Input Multiple-Output (MIMO) antenna system is provided. The BS includes: a receiver that receives a pattern index indicating one of a plurality of antenna grouping patterns and a codebook index indicating a grouped codebook vector from a user terminal; a controller that extends the grouped codebook vector according to the antenna grouping pattern indicated by the pattern index to determine a codebook vector for a plurality of antennas and configures a beamforming matrix by using the determined codebook vector; and a transmitter that precodes data by using the beamforming matrix and transmits the precoded data to the user terminal.

MODE FOR CARRYING OUT THE INVENTION

Hereinafter, exemplary embodiments of the present invention will be described in detail with reference to the accompanying drawings. Further, in the following description of the present invention, a detailed description of known functions and configurations incorporated herein will be omitted when it may make the subject matter of the present invention rather unclear. The terms which will be described below are terms defined in consideration of the functions in the present invention, and may be different according to users, intentions of the users, or customs. Therefore, the definition should be made based on the overall contents of the present specification.

Figure 1:
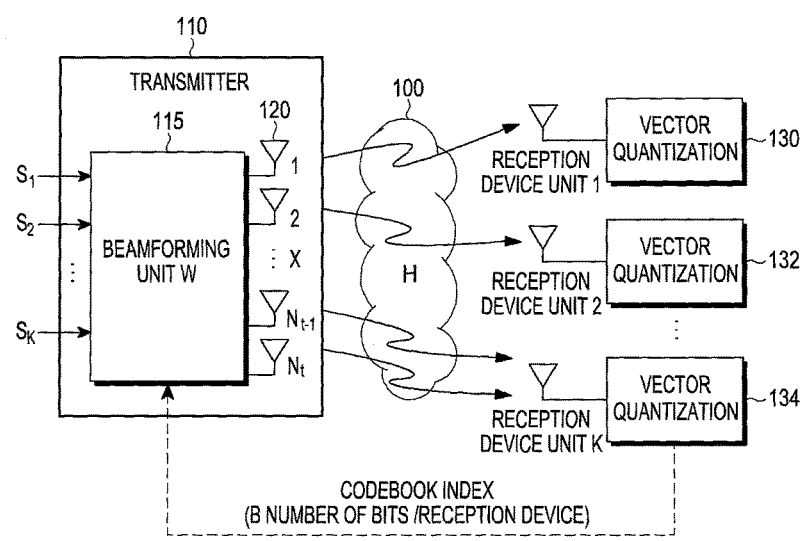
FIG. 1 schematically illustrates a structure of an FD-MIMO communication system including beamforming.

FIG. 1 schematically illustrates a structure of a FD-MIMO system including beamforming.

Referring to FIG. 1, a transmitting end 110 has an antenna array 120 including $N_t$ antennas, and includes a beamforming unit 115 that generates signals for K reception devices 130, 132, and 134 and transmits the generated signals through the antennas 120. Here, although it is illustrated that each of the reception devices 130, 132, and 134 has one antenna, the reception devices 130, 132, and 134 may have an antenna array including one or more antennas and receive signals from the antennas 120 of the transmitting end 110 through channels 100.

Each of the reception devices 130, 132, and 134 performs channel vector quantization to select a codebook index that maximizes an SINR. In general, a signal received by a $k^{th}$ reception device may be indicated by equation (1) below.

$$y_k = h_k^H x + z_k, k = 1, \ldots, K \quad (1)$$
$$x = \sum_i w_i s_i$$

In equation (1), $h_k$ denotes a channel vector from the antenna array 120 of the transmitting end 110 to a $k^{th}$ reception device, x denotes a transmission signal vector having an average power limit of p, and $z_k$ denotes Gaussian noise in the $k^{th}$ reception device. $w_i$ denotes a beamforming vector applied to the transmitting end 110 for an $i^{th}$ reception device and $s_i$ denotes a data symbol to be transmitted to the $i^{th}$ reception device.

When the transmitting end 110 applies linear beamforming, the signal received by the $k^{th}$ reception device may be indicated by equation (2) below.

$$y_k = h_k^H w_k s_k + h_k^H \sum_{j \neq k} w_j s_j + z_k \quad (2)$$

When interference by other reception devices except for the $k^{th}$ reception device, that is, $j^{th}$ reception devices is considered as noise, a sum rate of the reception devices may be indicated by equation (3) below.

$$R_{sum} = \sum_{k=1}^{K} \log_2 \left( 1 + \frac{\frac{\rho}{K} \left| h_k^H w_k \right|^2}{1 + \frac{\rho}{K} \sum_{j=1, j \neq k}^{K} \left| h_k^H w_j \right|^2} \right) \quad (3)$$

ρ denotes sum transmission power predetermined by the transmitting end, and the transmitting end may uniformly or non-uniformly distribute power to reception devices within the predetermined sum transmission power.

In a finite channel feedback system, the reception device may calculate Channel Direction Information (CDI) based on equation (4) below, and quantize the CDI.

$$\overline{h}_k = \frac{h_k}{\| h_k \|} \quad (4)$$

The reception device has a codebook $C = \{c_1, \ldots c_{2^B}\}$ according to a predetermined number of feedback bits B and selects a codebook index j that maximizes a received signal to noise ratio based on the CDI. The codebook is a set including $2^B$ $N_t \times 1$ codebook vectors $c_i$. That is, the index j corresponding to a codebook vector $c_j$ which is most similar to an original channel is determined among 1 to $2^B$. Equation (5) below shows an example of a formula for determining the codebook index j.

$$\hat{h}_k = \arg\max_{1 \le j \le 2^B} \left| \overline{h}_k^H c_j \right| \quad (5)$$

The selected codebook index consists of B bits and is fed back from each reception device to the transmitting end 110.

The transmitting end 110 receives the codebook index from K reception devices 130, 132, and 134 and configures a composite channel matrix as shown in equation (6) below.

$$\hat{H} = [\hat{h}_1, \hat{h}_2, \ldots, \hat{h}_k] \quad (6)$$

That is, the transmitting end 110 determines the codebook vector $c_j$ from the pre-given codebook C based on the codebook index j fed back from the $k^{th}$ reception device and map the codebook vector $c_j$ to $\hat{h}_k$. That is, channel state information of the $k^{th}$ reception device becomes $\hat{h}_k = c_j$. The composite channel matrix is configured by connecting channel state information $\hat{h}_{k'}$ acquired based on K codebook indexes fed back from the K reception devices.

A Zero Forcing (ZF) beamforming matrix acquired based on the composite channel matrix may be indicated by equation (7) below.

$$W_{\hat{H}} = \hat{H}(\hat{H}^H \hat{H})^{-1} \quad (7)$$

A beamforming vector for the $k^{th}$ reception device may be calculated based on equation (8) below by normalizing a $k^{th}$ column vector of the ZF beamforming matrix in order to meet a power limit of a transmitted signal.

$$w_k = \frac{W_{\hat{H}}(:, k)}{\| W_{\hat{H}}(:, k) \|} \quad (8)$$

The FD-MIMO system supporting beamforming may increase a downlink performance through feedback of channel state information and proper transmission beamforming using the fed back information. An amount of the fed back channel state information increases in proportion to the number of antennas of the transmitting end, but the amount of the fed back channel state information is limited in the actual system.

Particularly, in the multi-user MIMO system, when beamforming is not accurately performed, inter-user interference is not completely removed and there is a larger influence by the finite number of feedback bits compared to the single-user MIMO system. In the single-user MIMO system, the accuracy of the channel state information influences the performance but does not change the multiplexing gain. In contrast, in the multi-user MIMO system, the performance is not improved any more under a finite feedback condition due to interference, so that the accuracy of the channel state information directly influences the multiplexing gain of the multi-user MIMO downlink.

In order to acquire a sum rate similar to that acquired when complete channel state information is fed back, a feedback amount for quantizing channels should be set in proportion to the number of antennas at the transmitting end and a signal to noise ratio. According to an embodiment, the number of feedback bits required when a random vector quantization scheme is used may be expressed as equation (9) below.

$$B = \frac{N_t - 1}{3} \rho_{dB} \quad (9)$$

$\rho_{dB}$ denotes sum transmission power predetermined by the transmitting end by using dB ($\rho_{dB} = 10 \log_{10} \rho$. Since the transmitting end operates many antennas in the FD-MIMO system, it is impossible to simply extend the number of feedback bits. The following embodiment proposes a feedback scheme which can minimize performance deterioration and reduce feedback load.

Figure 2:
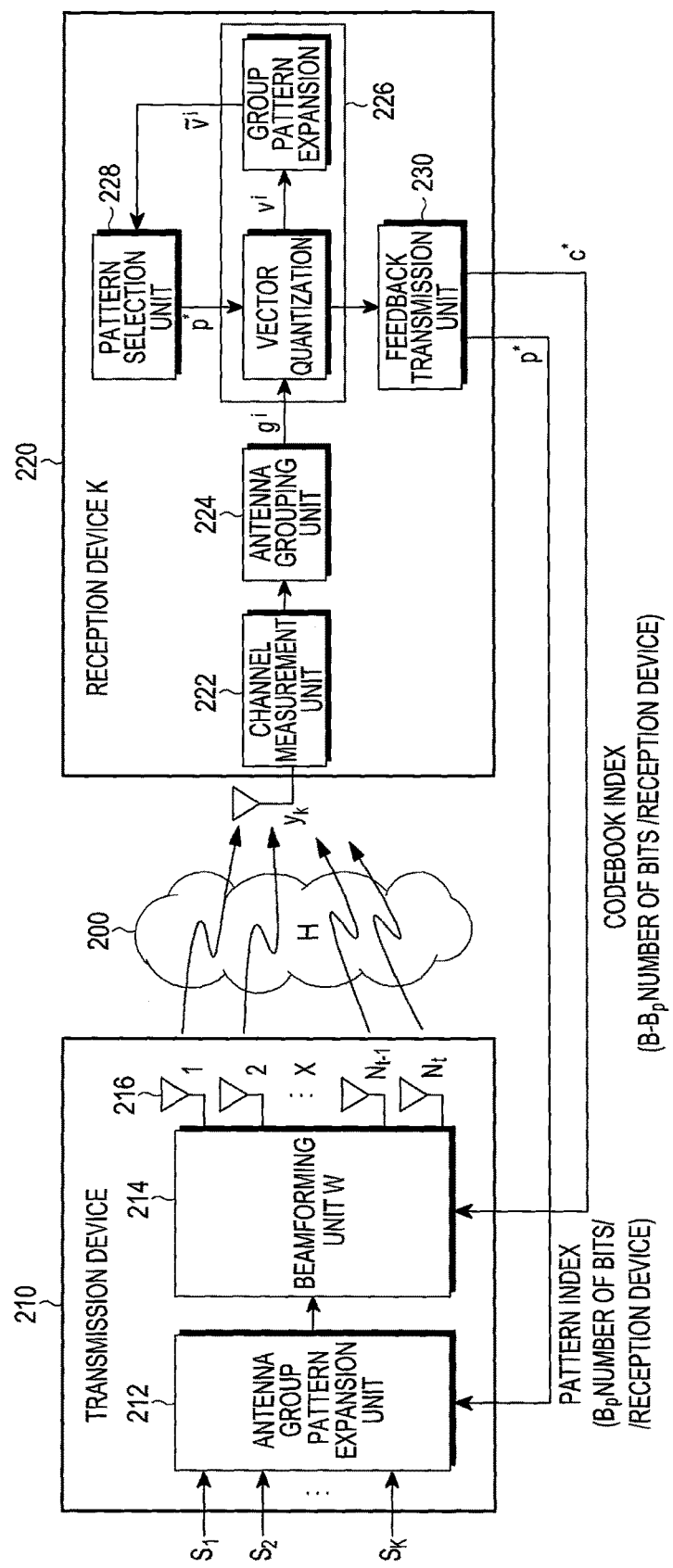
FIG. 2 is a block diagram illustrating a structure of a beamforming system based on antenna grouping according to an embodiment of the present invention.

FIG. 2 is a block diagram illustrating a structure of a beamforming system based on antenna grouping according to an embodiment of the present invention. Although FIG. 2 illustrates only one reception device 220, it is apparent that there may be one or more reception devices which similarly operate in the actual communication environment.

Referring to FIG. 2, the transmitting end 210 includes an antenna group pattern extension unit 212 having a data symbol s to be transmitted as an input, a beamforming unit 214 having a beamforming matrix W, and an antenna array 216 including $N_t$ antennas. Although the antenna group pattern extension unit 212 and the beamforming unit 214 are illustrated as separate entities, they may be implemented as one or more controllers or processors according to an implementation.

A reception device 220 includes one or more reception antennas 232, a channel measurement unit 222, an antenna grouping unit 224, a vector quantization and group pattern extension unit 226, a pattern selection unit 228, and a feedback transmission unit 230. Although the antenna grouping unit 224, the vector quantization and group pattern extension unit 226, and the pattern selection unit 228 are illustrated as separate entities, they may be implemented as one or more controllers or processors according to an implementation.

In the transmitting end 210, the antenna group pattern extension unit 212 determines channel state information, that is, a channel vector h corresponding to antennas grouped according to an antenna grouping pattern selected by the reception device 220 from predetermined antenna grouping patterns based on a pattern index fed back from each reception device. The beamforming unit 214 determines the beamforming matrix W based on the determined channel vector, precodes the input data symbol stream s according to the beamforming matrix W, and transmits the precoded data symbol stream s through a plurality of antennas 216.

The channel measurement unit 222 of the reception device 220 measures a channel vector $h = [h_1, h_2, \ldots, h_{N_t}]$ for the antennas 216 of the transmitting end 210 based on the signal received by the reception antenna 232, and the antenna grouping mapping unit 224 maps the channel vector to antenna groups according to predetermined antenna grouping patterns and calculates a grouped channel vector $g = [g_1, g_2, \ldots g_{N_g}]$ according to each antenna grouping pattern. The grouped channel vector includes channel coefficients corresponding to antenna group, and each channel coefficient is calculated using channel coefficients measured for antennas belonging to one antenna group. The vector quantization and group pattern extension unit 226 quantizes the grouped channel vector and determines a grouped codebook vector $v=[v_1, v_2, \ldots, v_{N_g}]$ for each antenna group according to each antenna grouping pattern and extends grouped codebook indexes according to the corresponding antenna grouping pattern and calculates an extended codebook vector $\tilde{v}=[\tilde{v}_1, \tilde{v}_2, \ldots, \tilde{v}_{N_t}]$ for each antenna 216. The codebook coefficients of the grouped codebook vector are determined from channel coefficients corresponding to antenna groups, and codebook coefficients of a de-mapped codebook vector are calculated by extending grouped codebook coefficients belonging to the same antenna group according to the antenna group size.

The pattern selection unit 228 acquires extended codebook vectors corresponding to a plurality of antenna grouping patterns, determines one antenna grouping pattern that maximizes a received signal to noise ratio by using the original channel vector and the extended codebook vectors, and transfers a pattern index indicating the determined antenna grouping pattern to the vector quantization and group pattern extension unit 226.

The vector quantization and group pattern extension unit 226 transfers a pattern index for identifying the determined antenna grouping pattern and a codebook index indicating a grouped codebook vector corresponding to the determined antenna grouping pattern to the feedback transmission unit 230. The feedback transmission unit 230 configures the pattern index and the codebook index in the form of message or packet according to a predetermined signaling scheme and feeds back the configured message or packet to the transmitting end 210.

As described above, the system according to the present invention groups antennas according to a predetermined antenna grouping pattern, quantizes a grouped channel vector, extends the quantized channel vector according to an antenna grouping pattern, and simultaneously selects a codebook index and a pattern index that maximize a received signal to noise ratio.

Figure 3:
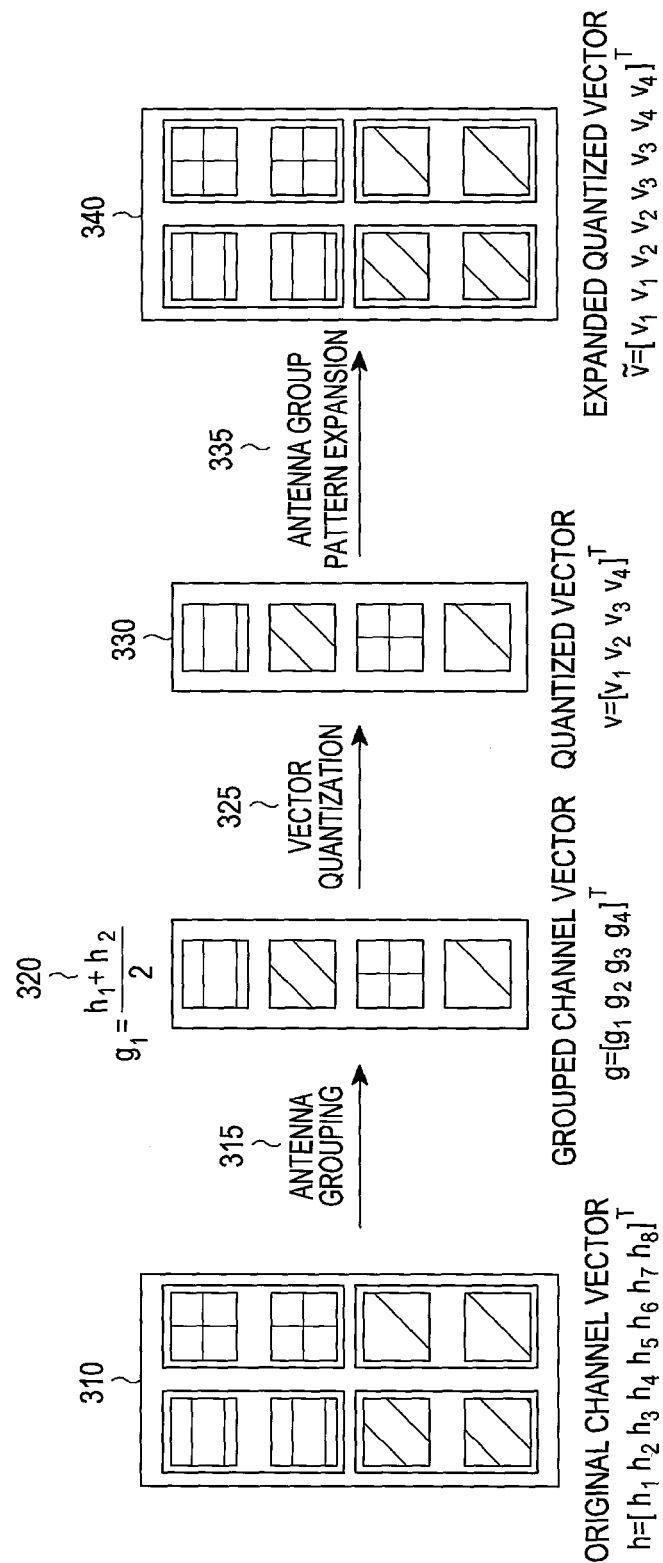
FIG. 3 is a diagram illustrating an antenna group pattern extension procedure according to an embodiment of the present invention.

FIG. 3 is a diagram illustrating an antenna group pattern extension procedure according to an embodiment of the present invention. Here, an extension for one specific antenna grouping pattern is illustrated, and an index k of the reception device will be omitted in the following description.

Referring to FIG. 3, the reception device performs antenna grouping 315, in other words, antenna group mapping for a channel vector 310 by using a specific antenna grouping pattern known to both the transmitting end and the reception device. In the illustrated example, channel coefficients measured for eight antennas of the transmitting end are $h_1, h_2, \ldots,$ and $h_8$, the specific antenna grouping pattern groups two adjacent antennas. That is, antennas 1 and 2 belong to antenna group 1, antennas 3 and 4 belong to antenna group 2, antennas 5 and 6 belong to antenna group 3, and antennas 7 and 8 belong to antenna group 4. Through the antenna group mapping 315, grouped channel coefficients $g_2, g_3,$ and $g_4$ corresponding to the four antenna groups, respectively, are generated.

The reception device quantizes the grouped channel vector as indicated by reference numeral 325 and determines grouped codebook coefficients $v_3$, and $v_4$ 330 corresponding to the four antenna groups. Specifically, the codebook vector $v_1$ is selected as a pre-given codebook by using the grouped channel vector $g_1$. According to an embodiment, the codebook is configured to be used in common for all antenna grouping patterns. According to another embodiment, the codebook may be configured according to the antenna grouping pattern, the antenna group size, or the number of antenna groups.

The grouped channel vectors extend to be extended codebook vectors 340 including extended codebook coefficients $v_1, v_1, v_2, v_2, v_3, v_3, v_4,$ and $v_4$ corresponding to the eight antennas through antenna group de-mapping 335 according to the corresponding antenna grouping pattern.

The reception device acquires extended codebook vectors corresponding to each of a plurality of antenna grouping patterns, determines an extended codebook vector, which minimizes a difference from original channel vector coefficients $h_1, h_2, \ldots,$ and $h_8,$ among the extended codebook vectors and an antenna grouping pattern corresponding to the extended codebook vector, and determines to feedback a pattern index indicating the determined antenna grouping pattern.

Hereinafter, a process for extending the antenna group pattern and determining the pattern index, performed by the reception device will be described in more detail.

Equation (10) below indicates a grouped channel vector generated through the antenna group mapping 315.

$$g^i = G^i h, i=1, \ldots, N_P \quad (10)$$

$g^i$ denotes a vector grouped by an $i^{th}$ antenna grouping pattern, where $g^i \in C^{N_g}$, $G^i$ denotes a $N_g \times N_t$ group mapping matrix for the $i^{th}$ antenna grouping pattern, and $N_P$ denotes the number of antenna grouping patterns.

The group mapping matrix $G^i$ determines a representative value of the channel coefficients to be grouped according to each antenna group. A method of determining the representative value may include linear combining and a method of calculating the average. The antenna group mapping by the averaging is illustrated in the example of FIG. 3. For example, $g_1$ corresponding to antenna group 1 including antennas 1 and 2 is $(h_1+h_2)/2$.

A dimension of the grouped channel vector $g^i$ is $N_g$, which is smaller than the dimension $N_t$ of the original channel vector $h$. $N_g$ may be calculated by $N_t/K$, and K denotes an antenna group size, that is, the number of antennas belonging to one antenna group. In the example of FIG. 3, the antenna group size is 2 and, accordingly, the dimension of the grouped channel vector is 4.

When the number of feedback bits required for channel vector quantization is B, the number of feedback bits may be divided into the number of bits $B_p$ for selecting an antenna grouping pattern and the number of bits $B-B_p$ for quantizing each grouped channel vector in the antenna grouping scheme. That is, the number of feedback bits $B_p$, which is a part of the total feedback load, is used for acquiring a pattern diversity gain. $B_p$ is the number of bits required for quantizing the pattern index and relates to the number of given antenna grouping patterns.

Feedback amounts per channel entry of the antenna grouping scheme according to an embodiment of the present invention and the conventional beamforming scheme are indicated by $(B-B_p)/N_g$ and $B/N_t$, respectively. The feedback amount per channel entry in the antenna grouping scheme is larger than the feedback amount per channel entry of the conventional beamforming scheme when the number of bits $B_p$ for selecting the antenna grouping pattern meets a condition of equation (11) below.

$$B_p < B\left(1 - \frac{N_g}{N_t}\right) \quad (11)$$

That is, $B_p$ may be determined to meet the condition of equation (11) above.

In general, transmitting end antennas of the FD-MIMO communication system have a high correlation therebetween and, above all, adjacent antennas have a higher correlation therebetween. Accordingly, since adjacent antennas are mainly grouped, $B_p$ is relatively smaller than B, and the feedback amount per channel entry of the antenna grouping scheme increases, so that the accuracy of quantization of the grouped channel vector increases.

As described above, the reception device quantizes the grouped channel vector to determine the grouped codebook vector and extends the determined codebook vector according to the antenna grouping pattern. Thereafter, the reception device selects a pattern index that maximizes a received signal to noise ratio based on the grouped codebook vector for each antenna grouping pattern.

A formula by which the reception device selects a pattern index and a codebook index may be expressed as equation (12) below.

$$[p^*, c^*] = \arg \max_E \max_c |\bar{h}^H Ec|^2 \qquad (12)$$

p* denotes a pattern index and c* denotes a codebook index. Further, E denotes an augmented matrix and has an inverse relation $(E^i = (G^i)^T)$ with the group mapping matrix $G^i$ of equation (10), and c denotes $B-B_p$ codebook vectors of the codebook $$C = \{c_1, c_2, \ldots, c_{2^{B-B_p}}\}.$$

The procedure for selecting the pattern index will be described below in more detail.

The reception device first determines a grouped codebook vector that minimizes a quantization error with $g^i$ as shown in equation (13) below based on the channel vector $g^1$ grouped by an $i^{th}$ antenna grouping pattern and the codebook $$C = \{c_1, c_2, \ldots, c_{2^{B-B_p}}\}.$$

according to the given number of feedback bits $B-B_p$.

$$v^i = \arg \max_{c \in C} |\bar{g}^{iH} c|, i = 1, \ldots, N_P \qquad (13)$$

$$\bar{g}^i = \frac{g^i}{\|g^i\|}$$

$\bar{g}^i$ denotes channel direction information of the grouped channel vector according to the $i^{th}$ antenna grouping pattern. Grouped codebook vectors $v^i$ are extended according to the corresponding antenna grouping pattern as shown in equation (14) below.

$$\tilde{v}^i = E^i v^i, i = 1, \ldots, N_P \qquad (14)$$

$\tilde{v}^i$ denotes an extended codebook vector based on the $i^{th}$ antenna grouping pattern, $E^i$ denotes an augmented matrix for the $i^{th}$ antenna grouping pattern, and $N_p$ denotes the number of antenna grouping patterns. For example, the augmented matrix may perform an operation for copying one beamforming coefficient to be used for beamforming coefficients of the same antenna group according to the grouping characteristic.

The extended codebook vector has the same dimension as that of the original channel vector and, accordingly, the reception device determines the pattern index p* that maximizes the signal to noise ratio of the reception device based on equation (15) using the original channel vector and the extended codebook vector.

$$p^* = \arg \max_{i=1,\ldots,N_P} |\bar{h}^H \tilde{v}^i| \qquad (15)$$

Figure 4:
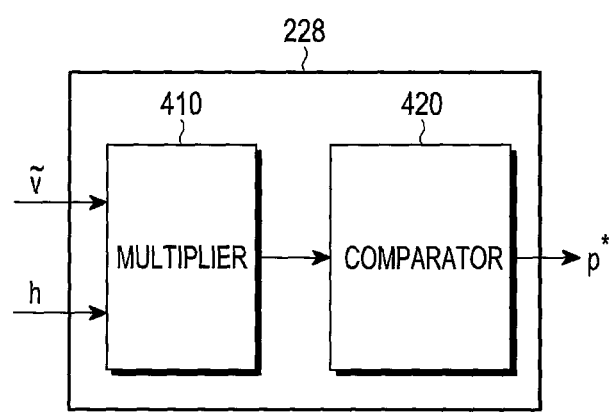
FIG. 4 is a block diagram illustrating a configuration of a pattern selection unit 228 according to an embodiment of the present invention.

FIG. 4 is a block diagram illustrating a configuration of the pattern selection unit 228 according to an embodiment of the present invention.

Referring to FIG. 4, the pattern selection unit 228 includes a multiplier 410 and a comparator 420. The multiplier 410 has a channel vector h measured for a signal received from the BS and an extended codebook vector $\tilde{v}$ for each antenna grouping pattern as inputs and calculate products of h and $\tilde{v}$. The comparator 420 determines an antenna grouping pattern corresponding to a maximum product by comparing the products of h and $\tilde{v}$ for antenna grouping patterns and outputs the pattern index p* for identifying the antenna grouping pattern.

The reception device transmits the determined pattern index p* and the codebook index c* corresponding to the pattern index p* to the transmitting end. Here, the codebook index c* is determined as an index of a codeword $v^{p*}$.

The antenna grouping scheme can acquire a diversity gain by antenna grouping patterns while reducing a dimension of the actual beamforming vector through grouping, thereby reducing a feedback amount per channel entry and maintaining a channel vector quantization performance.

Figure 5:
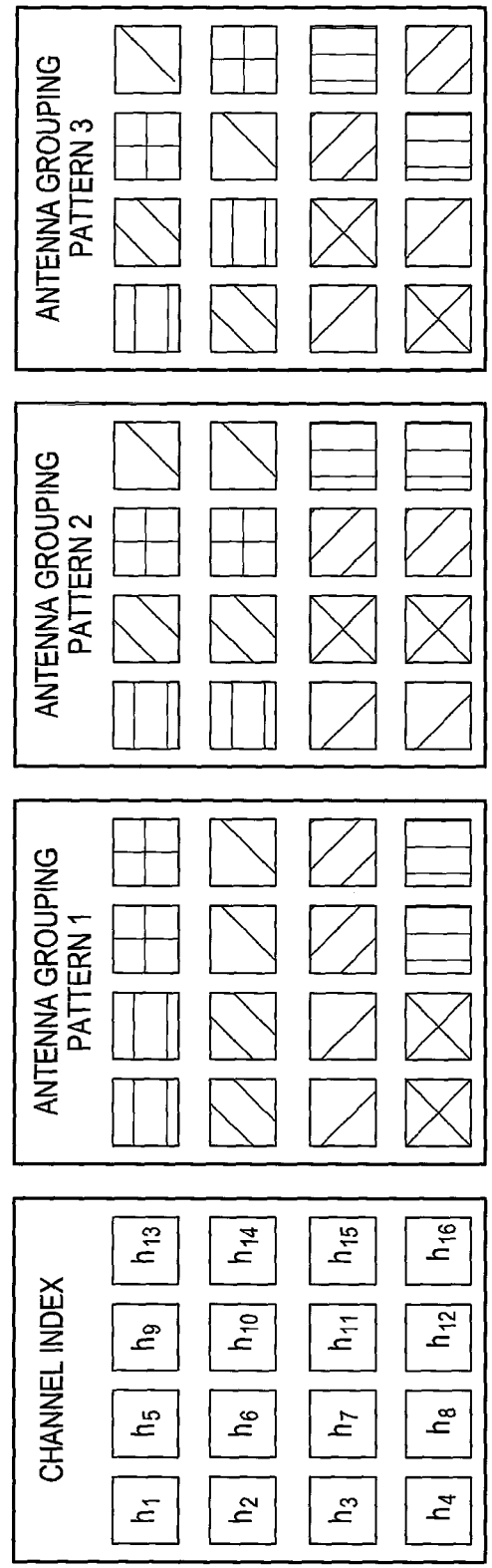
FIG. 5 illustrates antenna grouping patterns according to an embodiment of the present invention.

FIG. 5 illustrates antenna grouping patterns according to an embodiment of the present invention.

Referring to FIG. 5, a channel vector $h_i$ denotes a channel coefficient corresponding to an $i^{th}$ antenna, and an antenna array of the illustrated example indicates a configuration of antennas arranged in a 4×4 grid form. Antenna grouping pattern 1 groups two antennas adjacent in a horizontal direction as one antenna group and the first two antennas become one antenna group. Antenna grouping pattern 2 groups two antennas adjacent in a vertical direction as one antenna group. Antenna grouping pattern 3 groups a first antenna and an antenna diagonal to the first antenna as one antenna group and two adjacent antennas of the remaining antennas become one antenna group. The remaining antennas are grouped in a similar way.

The antenna grouping scheme according to an embodiment of the present invention is described below. For example, when an antenna grouping pattern $P_1 = (\{1,2\},\{3,4\})$ is given, an antenna group mapping matrix corresponding to the antenna grouping pattern is as shown in equation (16).

$$G^{P_1} = \frac{1}{2}\begin{bmatrix} 1 & 1 & 0 & 0 \\ 0 & 0 & 1 & 1 \end{bmatrix} \qquad (16)$$

The antenna grouping pattern $P_1 = (\{1,2\},\{3,4\})$ means that a first antenna and a second antenna are grouped as one antenna group and a third antenna and a fourth antenna are grouped as one antenna group. A vector grouped by the antenna group mapping matrix of equation (16) is indicated by $g^{P_1} = [h_1 + h_2 \; h_3 + h_4]^T$. A vector $v^{P_1} = [v_1^{P_1} \; v_2^{P_1}]^T$ acquired by performing vector quantization on the grouped vector is extended through equation (17) below.

$$\tilde{v}^{P_1} = E^{P_1} v^{P_1} = (G^{P_1})^T v^{P_1} = \frac{1}{2}\begin{bmatrix} v_1^{P_1} & v_1^{P_1} & v_2^{P_1} & v_2^{P_1} \end{bmatrix}^T \qquad (17)$$

$E^{P_1}$ is an augmented matrix according to the antenna grouping pattern $P_1=(\{1,2\}, \{3,4\})$ and has the inverse relation with the antenna group mapping matrix as described above $(E^{P_1}=(G^{P_1})^T)$.

In contrast, when an antenna grouping pattern $P_2=(\{1,3\}, \{2,4\})$ is given, an antenna group mapping matrix according to the antenna grouping pattern is as shown in equation (18) below.

$$G^{P_2} = \frac{1}{2}\begin{bmatrix} 1 & 0 & 1 & 0 \\ 0 & 1 & 0 & 1 \end{bmatrix} \quad (18)$$

Similar to the antenna grouping pattern $P_1$, a grouped vector acquired using the antenna grouping pattern $P_2=(\{1,3\}, \{2,4\})$ is indicated by $g^{P_2}=[h_1+h_3 \ h_2+h_4]^T$. A quantized vector for the antenna grouping pattern $P_2$ is $v^{P_2}=[v_1^{P_2} \ v_2^{P_2}]^T$ and an extended codebook vector may be acquired based on the following equation through an antenna group pattern augmented matrix $E^{P_2}$.

$$\tilde{v}^{P_2} = E^{P_2} v^{P_2}$$
$$= (G^{P_2})^T v^{P_2}$$
$$= \frac{1}{2}[v_1^{P_2} \ v_2^{P_2} \ v_1^{P_2} \ v_2^{P_2}]^T$$

In the FD-MIMO communication system, since the antennas of the transmitting end have a high correlation therebetween, it is efficient to group antennas, which are adjacent to each other as much as possible. In general, as antennas are physically close to each other, the antennas have a higher correlation. Further, a beamforming vector should be configured in consideration of phases of the BS and the user. In the FD-MIMO communication system, when an uplink feedback amount per user corresponds to B bits, among the B bits, $B_p$ bits are used to acquire a diversity gain of antenna grouping patterns and $B-B_p$ bits are used to acquire vector quantization in the antenna grouping scheme.

In the finite channel feedback system, $B_p$ is also finite. Since the antennas have a higher correlation therebetween the closer they are to each other, a correlation coefficient for expressing the correlation is also high. Accordingly, $B_p$ for acquiring the diversity gain of the antenna grouping patterns may be determined according to the correlation coefficient. When $B_p$ is determined, the antennas may be grouped according to the $2^{B_p}$ number of finite antenna grouping patterns by using a shifting property in which adjacent antennas shift by one block or two blocks.

According to an embodiment, a scenario in terms of feedback operation by the reception device, that is, a user terminal is described below.

First, each user terminal may determine $B_p$ and $B-B_p$. Each user terminal selects a codebook index of a codebook vector closest to the original channel through feedback resource allocation and a pattern index corresponding to the codebook index. To this end, a maximum $B_p$ is predetermined and antenna group patterns according to the maximum $B_p$ are also known to user terminals.

Second, the user terminal may determine an antenna group size as well as the resource allocation for the diversity gain of antenna grouping patterns and the vector quantization. In this case, the diversity gain for the antenna grouping patterns can be obtained but the user terminal requires more memory spaces to store the large number of antenna grouping patterns according to the antenna group size.

Figure 6:
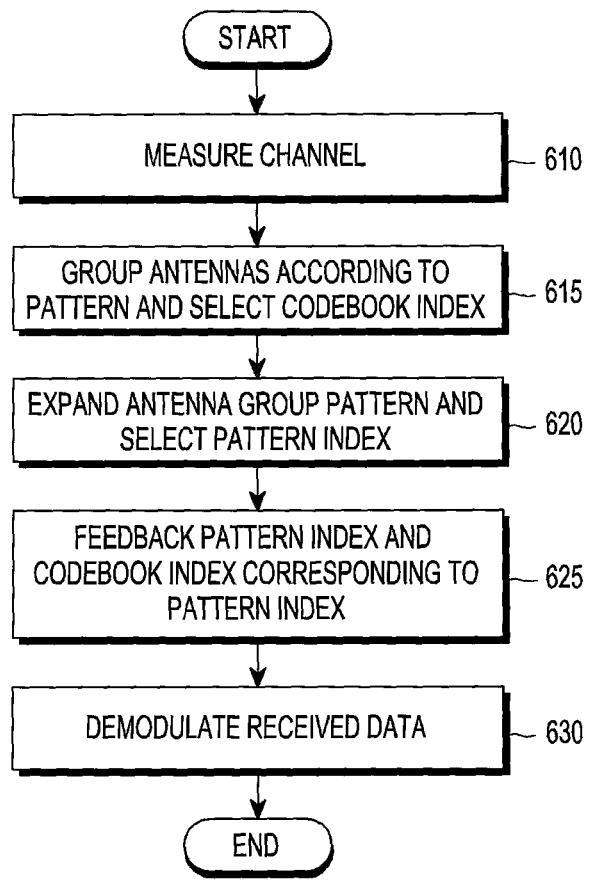
FIG. 6 is a flowchart illustrating an operation of a user terminal according to an embodiment of the present invention.

FIG. 6 is a flowchart illustrating an operation of the user terminal according to an embodiment of the present invention.

Referring to FIG. 6, in step 610, the user terminal performs channel measurement by using a pilot signal transmitted from the BS and acquires a channel vector for antennas of the BS. In step 615, the user terminal performs antenna group mapping according to each of the given antenna grouping patterns and determines a grouped codebook vector. In step 620, the user terminal selects a pattern index indicating an antenna grouping pattern that shows an optimal performance by de-mapping grouped codebook vectors according to a plurality of antenna grouping patterns. In step 625, the user terminal determines a grouped codebook vector corresponding to the antenna group pattern of the selected pattern index and feeds back the codebook index of the grouped codebook vector and the pattern index to the BS. In step 630, the user terminal demodulate received data through a precoded signal of the BS according to scheduling by the BS.

Figure 7:
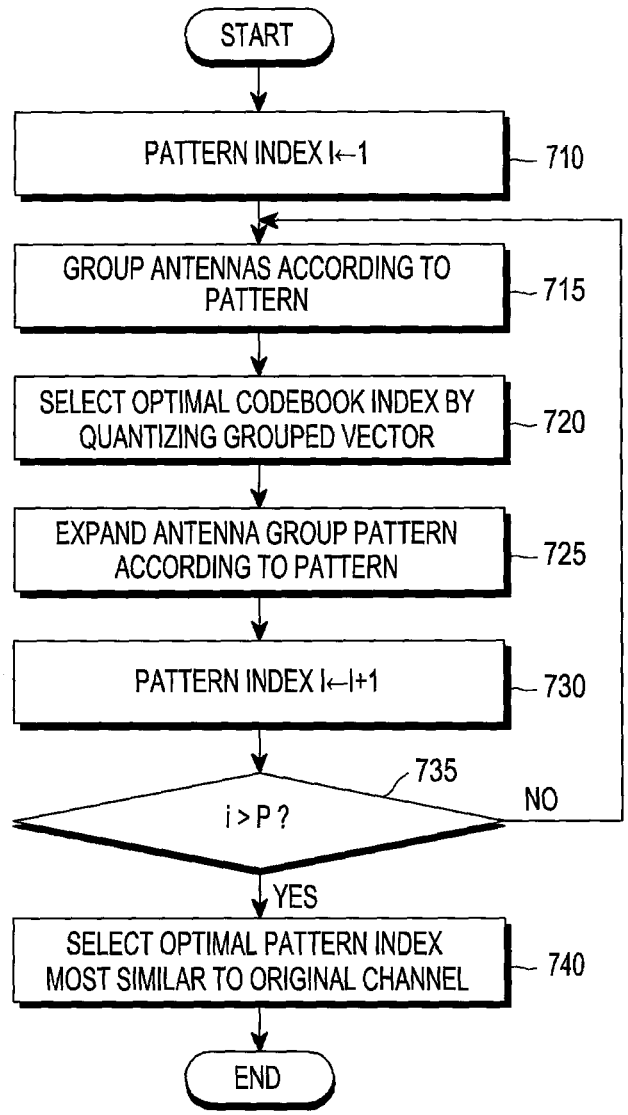
FIG. 7 is a flowchart illustrating a procedure in which the user terminal determines a pattern index according to an embodiment of the present invention.

FIG. 7 is a flowchart illustrating a procedure in which the user terminal determines a pattern index according to an embodiment of the present invention.

Referring to FIG. 7, the user terminal sets a pattern index i as 1 in step 710, and performs antenna group mapping on channel vectors according to an $i^{th}$ antenna grouping pattern in step 715, so as to determine a grouped channel vector. In step 720, the user terminal performs quantization on the grouped channel vector to select a grouped codebook vector and determines a codebook index for identifying the grouped codebook vector. In step 725, the user terminal extends the grouped codebook vector according to the $i^{th}$ antenna grouping pattern and determines the extended codebook vector.

After increasing the pattern index i by 1 in step 730, the user terminal determines whether i is larger than the number $N_p$ of given antenna grouping patterns in step 735. When i is not larger than $N_p$, the user terminal returns to process 715 and repeats steps 715 to 735 for the next antenna grouping pattern.

In step 740, the user terminal selects a codebook vector, which is most similar to the original channel vector, by using codebook vectors determined for all the antenna grouping patterns and a pattern index of the corresponding antenna grouping pattern.

Figure 8:
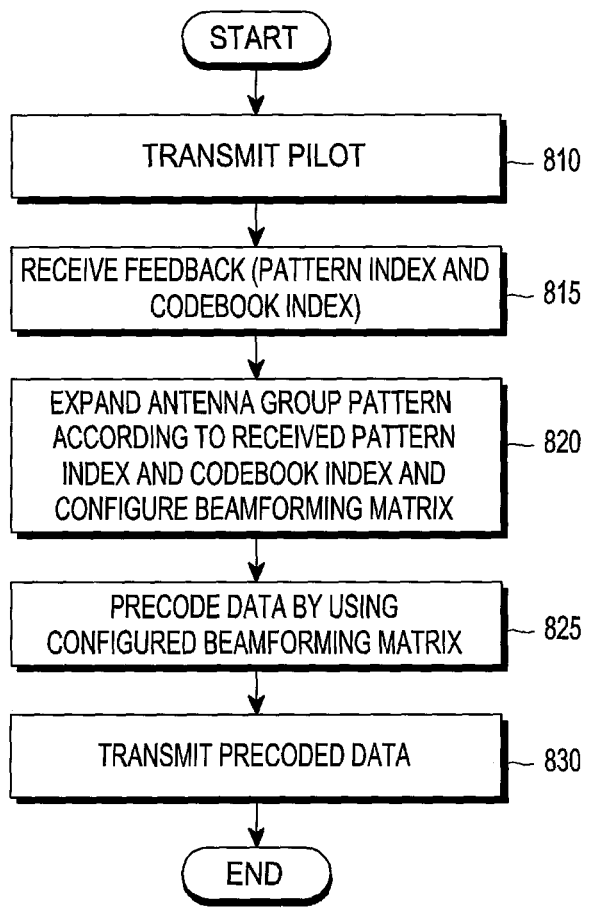
FIG. 8 is a flowchart illustrating an operation of a BS according to an embodiment of the present invention.

FIG. 8 is a flowchart illustrating an operation of the BS according to an embodiment of the present invention.

Referring to FIG. 8, in step 810, the BS transmits a pilot signal by using predetermined resources. In step 815, the BS receives feedback information including a pattern index and a codebook index from each user terminal through predetermined resources. In step 820, the BS determines a grouped codebook vector corresponding to the codebook index and an extended codebook vector according to an antenna grouping pattern of the pattern index and configures a beamforming matrix W by connecting extended codebook vectors for a plurality of user terminals. After precoding data by using the beamforming matrix in step 825, the BS transmits the data to the user terminals in step 830.

According to an embodiment of the present invention, antenna grouping patterns may be defined in consideration of a correlation between antennas. Configuring the antenna grouping patterns is the same as configuring the group mapping matrix $G^1$ or the group pattern augmented matrix $E^1$ which has an inverse relation therewith. One of the methods of easily configuring a pattern set corresponds to grouping antennas having a high correlation therebetween. In general, since adjacent antennas have a high correlation therebetween, the adjacent antennas may be grouped. FIG. 5 illustrates an embodiment in which adjacent antennas are grouped.

According to another embodiment, a pattern set of the antenna grouping patterns may be configured using information on a transmitting end correlation matrix and a subspace packing scheme. As the number of transmitting end antennas increases, the number of available patterns also increases, so that it is required to select patterns which show subspaces of all the available patterns well. To this end, a pattern set S may be acquired by applying a modified subspace packing scheme through the following process.

In a first stage, when the number of transmitting end antennas and the number of antenna groups are given, a total number of available patterns is defined. When a total initial available pattern set is $T=\{1, 2, \ldots, N_{possible}\}$ the total number of available patterns is as shown in equation (19) below.

$$N_{possible} = \frac{\prod_{n=0}^{N_g-1} \binom{N_t - n\kappa}{\kappa}}{N_g!} \quad (19)$$

K corresponds to $N_t/N_g$ and denotes the number of antennas per antenna group. When $N_{possible}$ is considerably large, hardware implementation may be limited due to a high calculation cost. For example, when $N_t=32$ and $N_g=16$, the total number of available patterns is substantially $N_{possible} \approx 1.9 \times 10^{17}$ and, in this case, $B_p=58$ feedback bits are required for pattern selection.

In a second stage, an effective transmitting end correlation matrix is defined and a Frobenius norm value is calculated for each pattern candidate. When the effective transmitting end correlation matrix is defined as $R_{eff}^i = R_t^{1/2} E^i$, the Frobenius norm value of the effective transmitting end correlation matrix $R_{eff}^i$ for each pattern candidate i∈T is calculated through equation (20) below.

$$r_i = \|R_t^{1/2} E^i\|_F \quad (20)$$

In a third stage, subsets of $L=2^{B+1}$ patterns are configured in an order of the larger Frobenius norm value. The subsets may be indicated by equation (21) below.

$$T_{partial} = \{i \in T, r_i > r^{L+1}\} \quad (21)$$

$r^{L+1}$ denotes an $L+1^{th}$ largest Frobenius norm value. In a last stage, a final pattern set S is acquired using the modified subspace packing scheme. In order to apply the subspace packing scheme, a relative distance value between antenna group patterns is needed. The relative distance value is calculated through a correlation matrix distance indicating orthogonality of correlation matrixes. When two matrixes X and Y exist, the correlation matrix distance may be calculated as equation (22) below.

$$d_{corr}(X, Y) = 1 - \frac{tr(X^H Y)}{\|X\|_F \|Y\|_F} \in [0, 1] \quad (22)$$

tr(·) corresponds to a trace function and denotes a sum of diagonal elements. $d_{corr}$ corresponds to a value indicating similarity between two matrixes. The two matrixes become more similar as $d_{corr}$ is smaller and more different as $d_{corr}$ is larger.

In order to calculate the final pattern set S, $$N_c = \binom{L}{N_P}$$

candidate sets $T_c = \{S_1, S_2, \ldots, S_{N_c}\}$ are acquired. Further, a minimum correlation matrix distance value of each candidate set $S_k = \{R_{eff}^{k,1}, R_{eff}^{k,2}, \ldots, R_{eff}^{k,N_P}\}$ is calculated through equation (23) below.

$$d_{k,min}(S_k) = \min_{1 \le m \le n \le N_P} d_{corr}(R_{eff}^{k,m}, R_{eff}^{k,n}) \quad (23)$$

$R_{eff}^{k,i}$ is an $i^{th}$ effective correlation matrix of a $k^{th}$ candidate set. As a result, the final pattern set S may be determined as equation (24) below.

$$S = \arg\max_{k=1,\ldots,N_c} d_{k,min}(S_k) \quad (24)$$

That is, the set, which maximizes the minimum correlation matrix distance like the subspace packing scheme, is selected as the final pattern set S.

The channel vector of the $k^{th}$ reception device considering transmitting end correlation matrix is as shown in equation (25) below.

$$h_k = R_{t,k}^{1/2} h_{w,k}$$

$$R_{t,k} \in C^{N_t \times N_t}, h_{w,k} \in C^{N_t} \quad (25)$$

In equation (25) above, $R_{t,k} \in C^{N_t \times N_t}$ is a transmitting end correlation matrix, and each element of $h_{w,k} \in C^{N_t}$ is a channel vector according to independent and identical distribution (i.i.d.). When a general exponential model is applied to learn an effect of a correlation coefficient on the transmitting end correlation matrix $R_{t,k}$, the correlation matrix $R_{t,k}$ may be indicated by equation (26) below.

$$R_{t,k} = \begin{bmatrix} 1 & \rho_i & \cdots & \rho_i^{N_t-1} \\ \rho_i^H & 1 & \cdots & \rho_i^{N_t-2} \\ \vdots & \vdots & \ddots & \vdots \\ \rho_i^{(N_t-1)H} & \rho_i^{(N_t-2)H} & \cdots & 1 \end{bmatrix} \quad (26)$$

Here, $\rho_i = \alpha e^{j\theta_k}$, where α denotes a correlation coefficient and $\theta_k$ denotes a phase of the $k^{th}$ reception device. Phases of reception devices are independent.

The antenna grouping scheme proposed by embodiments of the present invention can be changed in a direction for effectively distributing feedback resources. As described above, the total number of available patterns $N_{possible}$ exponentially increases according to the number of transmitting end antennas and the number of antenna groups. In order to control pattern complexity, the antenna array is divided into a predetermined number of areas and the antenna grouping scheme is applied only to one or more selected areas in a modified embodiment. At this time, area information indicating one or more selected areas may be additionally fed back. According to another embodiment, when an area selection reference is pre-appointed between the transmission device and the reception device, the feedback of the area information may be omitted.

Figure 9:
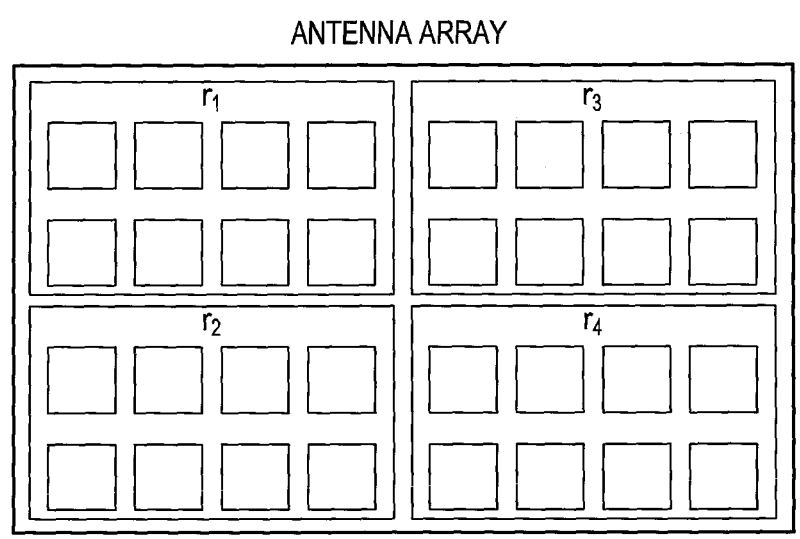
FIG. 9 illustrates an antenna array according to an embodiment of the present invention.

FIG. 9 illustrates a division of areas of a two dimensional antenna array according to an embodiment of the present invention.

Referring to FIG. 9, the original channel vector h is divided into sub vectors $r_1, \ldots, r_{N_R}$ corresponding to $N_R$ areas. Here, $r_i$ corresponds to a $$\frac{N_t}{N_R} \times 1$$

vector and denotes a channel vector that represents an $i^{th}$ area, and $N_R$ denotes a number of divided areas. Further, a beamforming gain value $\|r_i\|^2$ of each area is calculated.

Subsequently, the reception device applies the antenna grouping scheme to a particular area based on an assumption that the beamforming gain values for the areas are arranged in an ascending order. According to an embodiment, the antenna grouping scheme may be applied to an area having a small beamforming gain value, for example, $N'_R (\leq N_R)$ areas. In this case, a length $N_g$ of the groped channel vector is as shown in equation (27) below.

$$N_g = \frac{N_t}{N_R}(N_R - N'_R) + N'_R N'_{R,g} \qquad (27)$$

Here, $N'_{R,g}$ denotes a number of antenna groups in the selected area.

The embodiment of FIG. 9 has an advantage in that the total number of available patterns can be considerably reduced by applying the antenna grouping scheme only to a particular area. The number of available patterns of each area is as shown in equation (28) below.

$$N'_{possible} = \frac{\prod_{i=0}^{N'_{R,g}-1} \binom{N'_t - iK}{K}}{N'_{R,g}} \qquad (28)$$

Here, $$N'_t = \frac{N_t}{N_R}$$

denotes the number of antennas of each area. For example, when $N_t=32$, $N_R=4$, and $N'_{R,g}=4$, $N'_{possible}=105$ and the number of pattern feedback bits for indicating pattern candidates of this area is $B'_p=7$. Since $N'_R$ areas are selected, the final number of pattern feedback bits is $B_p=N'_R B'_p$. That is, compared to other embodiments, it is noted that the feedback complexity is significantly reduced.

Further, in the embodiment of FIG. 9, as the antenna grouping scheme is applied to an area having a small beamforming gain value, a larger number of feedback bits are allocated to $N_R - N'_R$ areas. For example, when $B_q$ is the number of feedback bits for vector quantization, the number of feedback bits $B_e$ per antenna is $$\frac{B_q}{N_g}.$$

In this case, $N'_{R,g} B_e$ bits are allocated to the area to which the antenna grouping is applied and $$\frac{N_t}{N_R} B_e$$

bits are allocated to the remaining areas. Because $$\frac{N_t}{N_R} \geq N'_{R,g},$$

more feedback resources are allocated to the area having the large beamforming gain and fewer feedback resources are allocated to the area having the small beamforming gain.

FIGS. 10, 11, 12, and 13 are graphs illustrating a sum rate performance of antenna grouping according to embodiments of the present invention.

Figure 10:
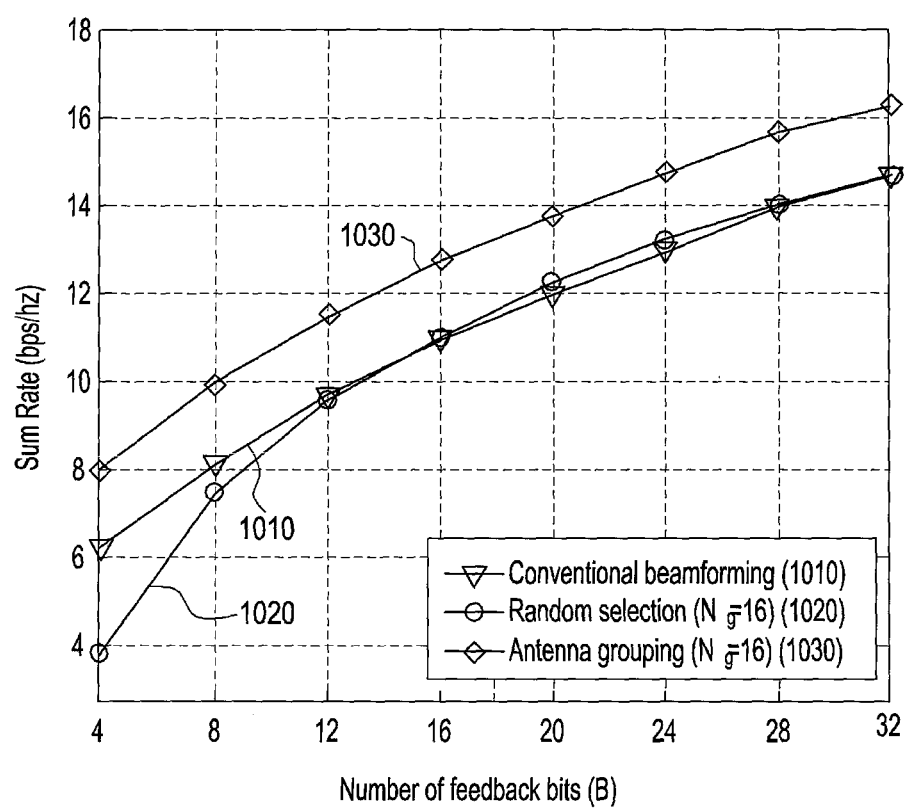
FIGS. 10, 11, 12, and 13 are graphs illustrating a sum rate performance of antenna grouping according to embodiments of the present invention.

FIG. 10 illustrates sum rates according to the number of feedback bits B based on the number of antenna groups $N_g$ in a case 1010 where $N_t$ antennas are used (conventional beamforming), in a case 1020 where $N_g$ antennas to be used are randomly selected (random selection with $N_g$), and a case 1030 where antenna grouping patterns determined considering a correlation between antennas are applied (antenna grouping with $N_g$). As illustrated in FIG. 10, the sum rate of the case 1030 where the antenna grouping patterns are applied according to an embodiment of the present invention is more excellent than those of the other cases 1010 and 1020.

Figure 11:
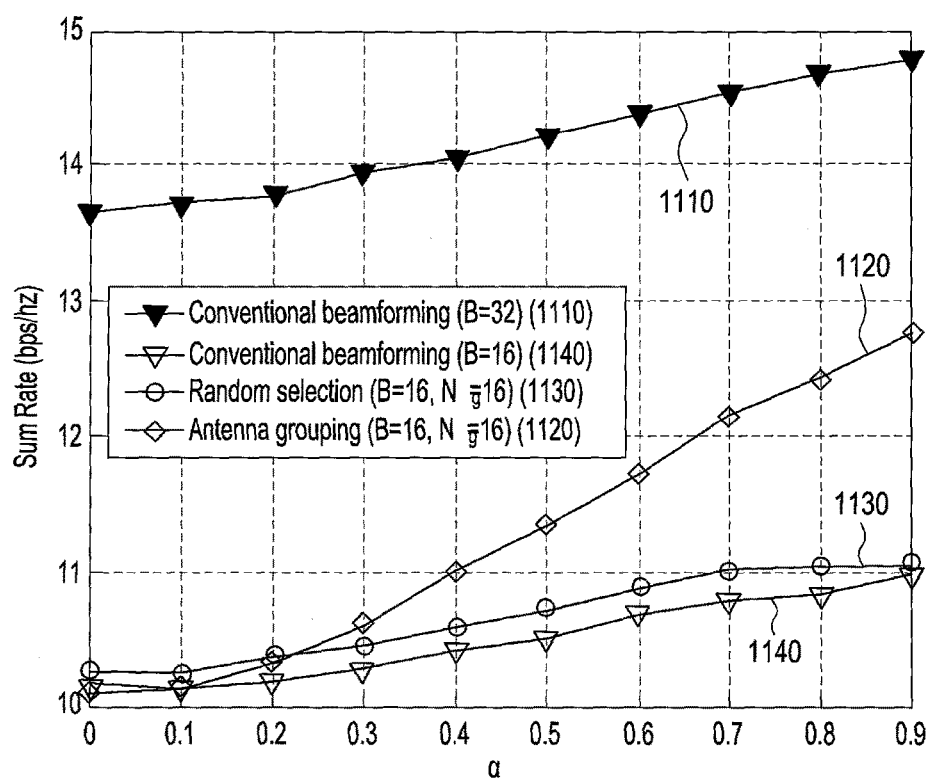

FIG. 11 illustrates sum rates according to the correlation coefficient α in a case 1110 where $N_t$ antennas are all used and the larger number of feedback bits are used (conventional beamforming (B=32)), a case 1140 where $N_t$ antennas are used and the same number of feedback bits are used (conventional beamforming (B=16)), a case 1130 where $N_g$ antennas are randomly selected (random selection with $N_g$), and a case 1120 where antenna grouping patterns determined considering a correlation between antennas are applied (antenna grouping with $N_g$). As illustrated in FIG. 11, the sum rate of the case 1120 where the antenna grouping patterns are applied according to an embodiment of the present invention is more excellent than those of other cases 1130 and 1140 and is considerably close to the performance of the case 1110 where the larger number of feedback bits are used.

Figure 12:
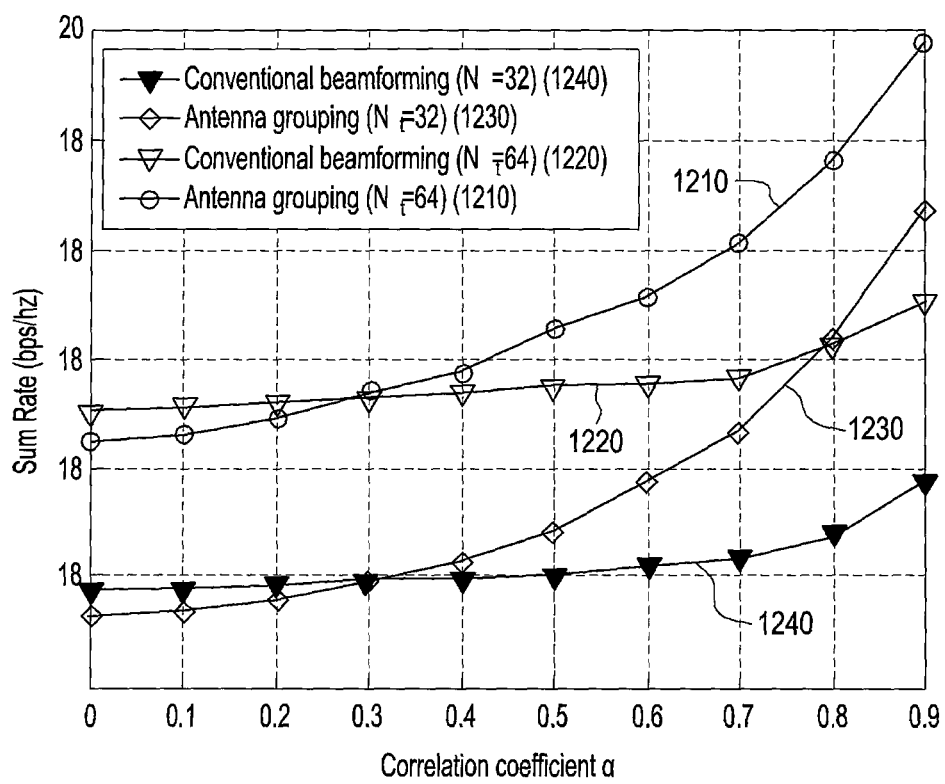
Figure 13:
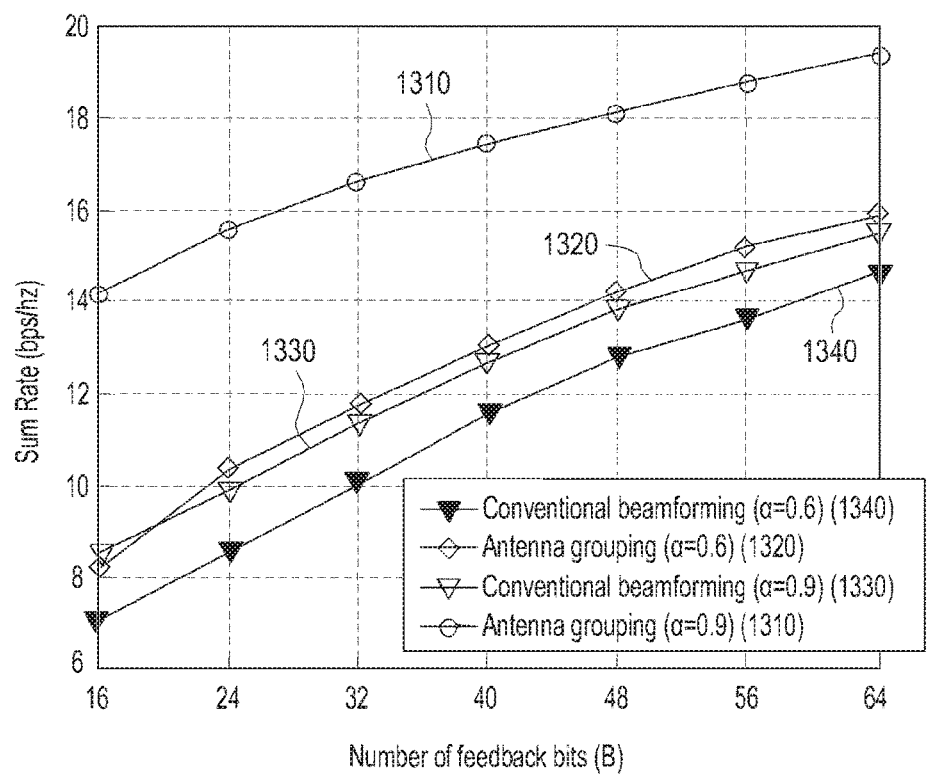

FIG. 12 illustrates sum rates in cases 1220 and 1240 where the antenna grouping scheme is not applied according to the correlation coefficient α based on $N_t \in \{32,64\}$ antennas (conventional beamforming) and cases 1210 and 1230 where the antenna grouping scheme according to the embodiment of FIG. 9 is applied (antenna grouping). As illustrated in FIG. 12, the sum rates in the cases where the antenna grouping scheme according to an embodiment of the present invention is applied become more excellent as the correlation is higher compared to the other cases. Particularly, when the correlation is high, the sum rate in the case where the antenna grouping scheme having the small number of transmitting end antennas is applied is higher than the sum rate in the case where the antenna grouping scheme having the large number of transmitting end antennas is not applied FIG. 13 illustrates sum rates in cases 1330 and 1340 where the antenna grouping scheme is not applied according to the number of feedback bits B based on the correlation coefficient α∈{0.6, 0.9} (conventional beamforming) and cases 1310 and 1320 where the antenna grouping scheme according to the embodiment of FIG. 9 is applied (antenna grouping). As illustrated in FIG. 13, it is noted that a difference between the sum rate in the case where the antenna grouping scheme according to an embodiment of the present invention is applied and the sum rate in the other case is larger as the correlation is higher. Particularly, the sum rate in the case where the antenna grouping scheme having the small correlation coefficient is applied is higher than the sum rate in the case where the antenna grouping scheme having the high correlation coefficient is not applied.

The embodiments of the present invention implemented as described above may reduce a feedback amount for channel vector quantization at a receiving end of the FD-MIMO antenna communication system and group antennas by using a characteristic that FD-MIMO system antennas have a high correlation to increase a channel quantization performance, thereby acquiring the same performance as that of the prior art through the smaller number of feedback bits.

Although specific exemplary embodiments have been described in the detailed description of the present invention, various change and modifications may be made without departing from the spirit and scope of the present invention. Therefore, the scope of the present invention should not be defined as being limited to the embodiments, but should be defined by the appended claims and equivalents thereof.

The invention claimed is:

1. A method of grouping antennas in a multiple-input multiple-output (MIMO) antenna system, the method comprising:
measuring a channel vector for a plurality of antennas of a base station;
grouping channel coefficients of the channel vector according to a plurality of antenna grouping patterns and determining grouped codebook vectors corresponding to the grouped channel coefficients;
identifying an antenna grouping pattern from the plurality of antenna grouping patterns based on the grouped codebook vectors for the antenna grouping patterns; and
transmitting a pattern index indicating the identified antenna grouping pattern and a codebook index indicating a grouped codebook vector corresponding to the identified antenna grouping pattern to the base station.

2. The method of claim 1, wherein each of the grouped codebook vectors includes codebook vector coefficients corresponding to antenna groups according to a corresponding antenna grouping pattern, and each of the codebook vector coefficients is calculated as linear combining or an average of channel coefficients for antennas of a corresponding antenna group.

3. The method of claim 1, wherein identifying the antenna grouping pattern comprises:
extending the grouped codebook vectors according to the plurality of antenna grouping patterns and determining extended codebook vectors corresponding to the antenna grouping patterns, each of the extended codebook vectors including codebook vector coefficients corresponding to the plurality of antennas;
identifying an extended codebook vector closest to the channel vector among the extended codebook vectors; and
identifying the antenna grouping pattern corresponding to the identified extended codebook vector.

4. The method of claim 1, wherein identifying an extended codebook vector comprises:
calculating products of extended codebook vectors and the channel vector; and
identifying the extended codebook vector corresponding a maximum product by comparing the products with each other.

5. The method of claim 1, wherein the plurality of antenna grouping patterns groups a plurality of antennas having a relatively high correlation therebetween as an equal antenna group.

6. The method of claim 1, wherein a number of bits of the pattern index is determined according to at least one of a total number of bits for feedback, a number of plurality of antennas, and a number of antenna groups of each antenna grouping pattern.

7. The method of claim 1, wherein a number of a plurality of antenna grouping patterns is determined according to at least one of a number of bits of the pattern index, a number of a plurality of antennas, and a number of antenna groups of each antenna grouping pattern.

8. The method of claim 1, wherein each antenna grouping pattern is configured to group, as a first antenna group, antennas adjacent in one of a horizontal direction, a vertical direction, and a diagonal direction among the plurality of antennas,
configured to group a plurality of antennas, to which a transmitting end correlation matrix and a subspace packing scheme are applied, as an equal antenna group,
configured to group, as a second antenna group, antennas included in one or more areas identified from a predetermined number of areas into which the plurality of antennas are divided, or
configured to group, as a third antenna group, antennas included in one or more areas, which have beamforming gain values equal to or smaller than a predetermined reference value, identified from the predetermined number of areas into which the plurality of antennas are divided.

9. The method of claim 8, wherein area information indicating the one or more areas identified is transmitted from a user terminal.

10. A method of grouping antennas in a multiple-input multiple-output (MIMO) antenna system, the method comprising:
receiving a pattern index indicating one of a plurality of antenna grouping patterns and a codebook index indicating a grouped codebook vector from a user terminal;
extending the grouped codebook vector according to the antenna grouping pattern indicated by the pattern index and determining a codebook vector for a plurality of antennas;
configuring a beamforming matrix based on the determined codebook vector; and
precoding data based on the beamforming matrix and transmitting precoded data to the user terminal.

11. The method of claim 10, wherein the grouped codebook vector includes codebook vector coefficients corresponding to antenna groups according to the antenna grouping pattern indicated by the pattern index, and each of the codebook vector coefficients is calculated as linear combining or an average of channel coefficients for antennas of a corresponding antenna group.

12. The method of claim 10, wherein the antenna grouping pattern indicated by the pattern index is determined through:
    extending grouped codebook vectors corresponding to the plurality of antenna grouping patterns according to the plurality of antenna grouping patterns and determining extended codebook vectors corresponding to the antenna grouping patterns, each of the extended codebook vectors including codebook vector coefficients corresponding to the plurality of antennas;
    identifying an extended codebook vector closest to a channel vector among the extended codebook vectors; and
    identifying an antenna grouping pattern corresponding to the identified extended codebook vector.

13. The method of claim 12, wherein selecting the extended codebook vector comprises:
    calculating products of the extended codebook vectors and the channel vector; and
    identifying the extended codebook vector corresponding a maximum product by comparing the products with each other.

14. The method of claim 10, wherein the plurality of antenna grouping patterns groups a plurality of antennas having a relatively high correlation therebetween as an equal antenna group.

15. The method of claim 10, wherein a number of bits of the pattern index is determined according to at least one of a total number of bits for feedback, a number of plurality of antennas, and a number of antenna groups of each antenna grouping pattern.

16. The method of claim 10, wherein a number of the plurality of antenna grouping patterns is determined according to at least one of a number of bits of the pattern index, a number of a plurality of antennas, and a number of antenna groups of each antenna grouping pattern.

17. The method of claim 10, wherein each of said plurality of antenna grouping pattern is configured to group, as a first antenna group, antennas adjacent in one of a horizontal direction, a vertical direction, and a diagonal direction among the plurality of antennas,
    configured to group a plurality of antennas, to which a transmitting end correlation matrix and a subspace packing scheme are applied, as an equal antenna group,
    configured to group, as a second antenna group, antennas included in one or more areas identified selected from a predetermined number of areas into which the plurality of antennas are divided, or
    configured to group, as a third antenna group, antennas included in one or more areas, which have beamforming gain values equal to or smaller than a predetermined reference value, identified from the predetermined number of areas into which the plurality of antennas are divided.

18. The method of claim 17, wherein area information indicating the one or more areas identified is transmitted from the user terminal.

19. A terminal supporting antenna grouping in a multiple-input multiple-output (MIMO) antenna system, the terminal comprising:
    a channel measurement processor configured to measure a channel vector for a plurality of antennas of a base station (BS);
    a controller configured to group channel coefficients of the channel vector according to a plurality of antenna grouping patterns to determine grouped codebook vectors corresponding to the grouped channel coefficients and identifies an antenna grouping pattern from the antenna grouping patterns based on the grouped codebook vectors for the antenna grouping patterns; and
    a transceiver configured to transmit a pattern index indicating the identified antenna grouping pattern and a codebook index indicating a grouped codebook vector corresponding to the identified antenna grouping pattern to the BS.

20. A base station (BS) supporting antenna grouping in a multiple-input multiple-output (MIMO) antenna system, the BS comprising:
    a transceiver configured to receive a pattern index indicating one of a plurality of antenna grouping patterns and a codebook index indicating a grouped codebook vector from a user terminal;
    a controller configured to extend the grouped codebook vector according to the antenna grouping pattern indicated by the pattern index to determine a codebook vector for a plurality of antennas and configures a beamforming matrix based on the determined codebook vector; and
    the transceiver configured to precode data based on the beamforming matrix and transmits the precoded data to the user terminal.

* * * * *